United States Patent [19]

Hamilton et al.

[11] Patent Number: 4,722,548
[45] Date of Patent: Feb. 2, 1988

[54] COMPUTER OPTIMIZED ADAPTIVE SUSPENSION SYSTEM HAVING COMBINED SHOCK ABSORBER/AIR SPRING UNIT

[76] Inventors: James M. Hamilton, 1167 Loma Portal Dr., El Cajon, Calif. 92020; Lonnie K. Woods, 2722 Lindsay Michelle, Alpine, Calif. 92001

[21] Appl. No.: 913,608

[22] Filed: Sep. 29, 1986

Related U.S. Application Data

[63] Continuation of Ser. No. 644,807, Aug. 27, 1984, abandoned, which is a continuation-in-part of Ser. No. 523,279, Aug. 15, 1983, Pat. No. 4,468,050, and a continuation-in-part of Ser. No. 352,239, Feb. 25, 1982, Pat. No. 4,468,339, which is a continuation-in-part of Ser. No. 322,200, Nov. 17, 1981, abandoned.

[51] Int. Cl.⁴ ............................................. B06G 11/26
[52] U.S. Cl. ..................................... 280/707; 280/714
[58] Field of Search ............... 280/707, 714, DIG. 1; 364/424; 267/64.16, 64.25; 188/285, 299, 318

[56] References Cited

U.S. PATENT DOCUMENTS

| | | | |
|---|---|---|---|
| 601,339 | 3/1898 | Freeman | 177/208 |
| 1,160,976 | 11/1915 | Myers | 188/285 |
| 2,247,749 | 7/1941 | De Venel | 280/124 |
| 2,339,152 | 1/1944 | Connelly et al. | 265/47 |
| 2,893,104 | 7/1959 | Hancock | 267/15 |
| 2,967,062 | 1/1961 | D'Avigdor | 280/112 |
| 2,973,969 | 3/1961 | Thall | 280/124 |
| 2,993,705 | 7/1961 | D'Avigdor | 280/112 |
| 3,035,853 | 5/1962 | Klein | 280/124 |
| 3,063,701 | 11/1962 | Long, Jr. | 267/64 |
| 3,063,702 | 11/1962 | Long, Jr. | 267/64 |
| 3,063,703 | 11/1962 | Harbers et al. | 267/65 |
| 3,124,368 | 3/1964 | Corley et al. | 280/6 |
| 3,310,976 | 3/1967 | Bussell et al. | 73/65 |
| 3,321,210 | 5/1967 | Delchev | 280/6 |
| 3,331,458 | 7/1967 | Van Raden et al. | 177/141 |
| 3,420,325 | 1/1969 | McAlister et al. | 177/137 |
| 3,502,347 | 3/1970 | Busignies | 280/124 |
| 3,513,300 | 5/1970 | Elfenbein et al. | 235/150.2 |
| 3,574,352 | 4/1971 | Elliott | 280/124 |
| 3,584,893 | 6/1971 | Tuczuk et al. | 280/124 |
| 3,595,597 | 7/1971 | Wenham | 280/124 |
| 3,606,365 | 9/1971 | Strong | 280/6 |
| 3,608,925 | 9/1971 | Murphy | 280/112 |
| 3,666,286 | 5/1972 | Engfer | 280/124 |

(List continued on next page.)

FOREIGN PATENT DOCUMENTS

| | | |
|---|---|---|
| 2848286 | 5/1979 | Fed. Rep. of Germany ...... 280/707 |
| 1079482 | 11/1954 | France . |
| 2173364 | 10/1973 | France . |

(List continued on next page.)

OTHER PUBLICATIONS

Translation for Dutch Patent 7,316,435.
Translation for French Patent 1,079,482.
Burness, "The Long and Short of Suspension," Jul. 1978, pp. 4–7.

(List continued on next page.)

*Primary Examiner*—John J. Love
*Assistant Examiner*—Ross Weaver
*Attorney, Agent, or Firm*—Christie, Parker & Hale

[57] ABSTRACT

A vehicle suspension system in which a computer controls damping and spring forces to optimize ride and handling characteristics under a wide range of driving conditions. A combined shock absorber/air spring unit is connected between the wheel and frame of a vehicle. The shock absorber includes a hydraulic sensor which provides signals to the computer which are representative of the position of the piston within the shock absorber. The computer utilizes these signals to control compression and rebound hydraulic pressure regulators to produce preprogrammed compression and rebound damping forces that will yield the desired ride and handling. The air spring may be connected in series with the shock absorber for compression and rebound along the same axis. Pressure sensors and air pressure inlet and outlet valves are connected to the computer for adjusting the pressure within the air spring to provide the desired spring rate.

32 Claims, 6 Drawing Figures

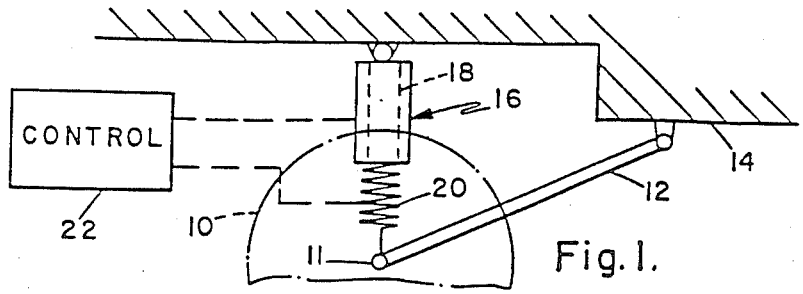
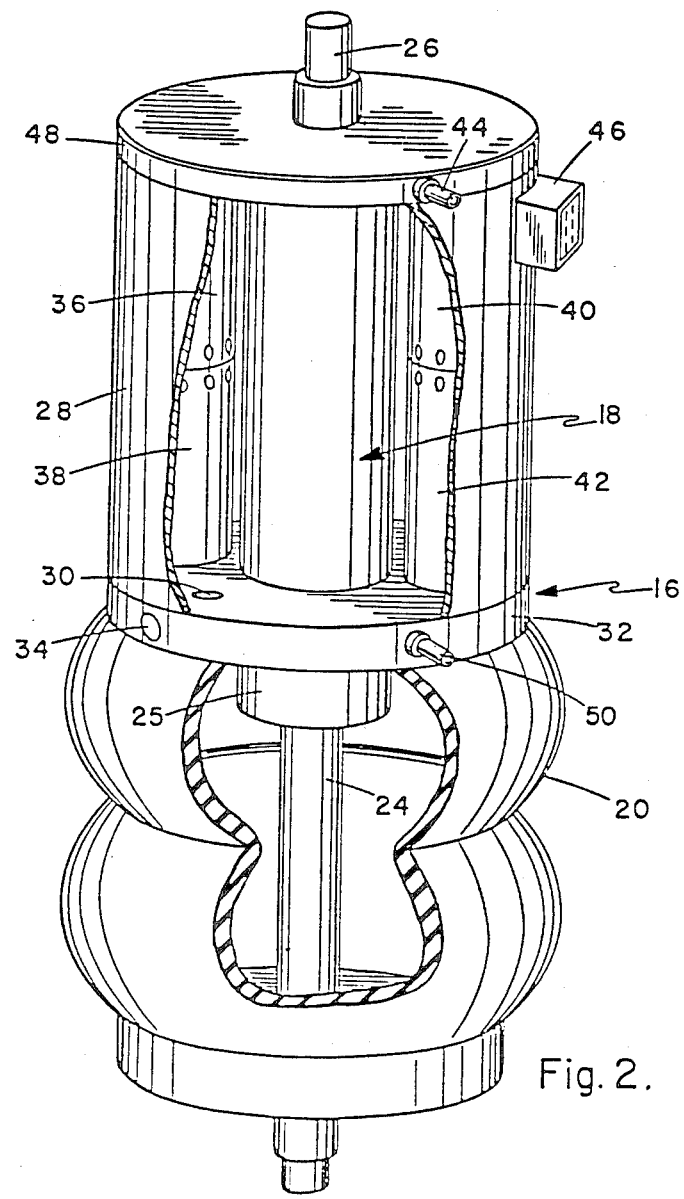

COMPUTER OPTIMIZED ADAPTIVE SUSPENSION SYSTEM HAVING COMBINED SHOCK ABSORBER/AIR SPRING UNIT

CROSS REFERENCE TO RELATED APPLICATIONS

This is a continuation of application Ser. No. 644,807 filed Aug. 27, 1984 now abandoned, which is a continuation-in-part of U.S. Ser. No. 523,279 filed Aug. 15, 1983, now U.S. Pat. No. 4,468,050 U.S. Ser. No. 352,239 filed Feb. 25, 1982 now U.S. Pat. No. 4,068,339 the latter being a continuation-in-part of U.S. Ser. No. 322,200 filed Nov. 17, 1981 (now abandoned).

FIELD OF THE INVENTION

The present invention relates to vehicle suspension systems, and more particularly to a vehicle suspension system in which a computer controls damping or spring forces or both to optimize ride and handling characteristic under a wide range of driving conditions.

DISCUSSION OF THE PRIOR ART

Vehicle suspension systems have heretofore included shock absorbers, springs (coil, leaf, air or torsion bar), axle housings, torque arms, A-frames, anti-roll bars and stabilizers, among others. These components have been assembled in various combinations to produce the desired ride and handling characteristics of the vehicle. More accurately, because many compromises must be made, the ride and handling characteristics are chosen to be as close to desired as possible. In a typical suspension system, changes in the spacing between axles and the body/chassis are cushioned by springs. Spring vibration is limited by dampers which are usually called shock absorbers.

In general terms a shock absorber is a velocity-sensitive hydraulic damping device which uses hydraulic pressure to resist movement of the suspension springs to limit and control the action of the springs. Piston velocity is a direct function of the speed of suspension movement. In any given shock absorber, a low piston velocity produces low pressure and little control, while higher piston velocity generates more pressure and greater control. Wheel movements, that is, changes in the relationship between axles (unsprung mass) and the chassis (sprung mass) are cushioned and controlled primarily by the suspension springs. The movement of the springs—spring vibration—is motion that must be limited, or damped by the shock absorbers.

It has been said that shock absorber design is one of the few facets of automotive engineering that remains more of an art than a science. Shock absorbers typically dissipate energy stored in the springs by gradually forcing oil through orifices and valves. The flow resistance encountered by the oil results in compression and rebound damping forces which control the spring movement. The work done by the oil as it moves through the valves converts energy stored in the springs into heat which is dissipated from the shock absorbers into the surrounding air. The ride can be made softer or stiffer by varying the fluid flow through the valves and orifices.

The amount of force exerted by a spring is proportional to how far it is deflected. The amount of force exerted by a hydraulic shock absorber is proportional to the velocity of the piston therein. Modern hydraulic shock absorbers include, for example, a six-stage valve system (three compression stages and three rebound stages) to provide optimum control at various piston velocities.

The goal in a conventional suspension system is to match the resistance or control force of the shock absorbers to the forces generated by their corresponding springs in a manner that will yield the desired ride and handling characteristics. The control forces which conventional shock absorbers exhibit during compression and rebound are determined by their particular bleed valves, blow-off valves, spring discs, blow-off springs or piston restrictions, etc. The damping curves (force versus piston velocity) of conventional shock absorbers are predetermined by their construction and are not adjusted during vehicle travel. However, the responses of such suspensions are fixed and their shock absorbers can respond in a desired manner to only a limited range of conditions, with arguably optimum response available in an even more limited range of conditions.

In the past various manual and automatic vehicle leveling systems have been devised for maintaining a predetermined height between the sprung mass of the vehicle (frame and body) and the unsprung mass (wheels, drive train, front axle and rear axle). Many of these systems pump air into, or discharge air from, air springs to raise or lower the vehicle body relative to its wheels. Exemplary vehicle leveling systems are disclosed in U.S. Pat. Nos. 3,574,352, 3,584,893, 3,66,286, 3,830,138, 3,873,123, 4,017,099, 4,054,295, 4,076,275, 4,084,830, 4,162,083, 4,164,664, 4,105,216, 4,168,840 and 4,185,845. The principal object of such vehicle leveling systems is to accommodate variations in vehicle load rather than to actively adjust shock absorbers and springs during vehicle travel to improve ride and handling.

Other vehicle suspension systems have been developed for automatically accommodating dynamic loading effects during vehicle travel. U.S. Pat. Nos. 2,967,062, 2,993,705 and 3,608,925 are directed to systems for controlling the roll of a vehicle, for example, during a turn. U.S. Pat No. 3,995,883 discloses a vehicle suspension system in which a wheel-to-body displacement transducer and an acceleration transducer on the vehicle body produce signals which are utilized to vary the damping forces in the system. U.S. Pat. No. 4,065,154 discloses a vehicle suspension system in which signals from a plurality of wheel axle velocity transducers are utilized in varying the damping forces. British Pat. Nos. 1,522,795 discloses a vehicle suspension system in which an electrically actuable spool valve controls the application of fluid pressure to a damping control valve.

Other actively controlled vehicle suspension systems are disclosed in U.S. Pat. Nos. 2,247,749, 2,973,969, 3,124,368, 3,321,210, 3,502,347 and 4,215,403.

SUMMARY OF THE INVENTION

The primary object of the present invention is to provide an improved vehicle suspension system which will automatically adjust itself during vehicle travel to provide optimum ride and handling characteristics under a wide variety of driving conditions.

Another object of the present invention is to provide such an automatic vehicle suspension system in which both damping and spring forces may be adjusted.

Another object of the present invention is to provide a combined shock absorber/air spring unit for use in an automatically controlled vehicle suspension system.

Another object of the present invention is to provide a computer optimized adaptive suspension system which will automatically reduce roll, pitch and oscillation, provide improved wheel rebound control and absorb large bumps optimally.

Another object of the present invention is to provide a vehicle suspension system which will insure a smooth, level ride over rough roads.

Still another object of the present invention is to provide a vehicle suspension system which will allow compression and rebound damping to be varied independently.

Still another object of the present invention is to provide a vehicle suspension system which will automatically maintain a selected but adjustable wheel-to-body height for varying loading conditions.

Yet another object of the present invention is to provide a vehicle suspension system capable of varying damping substantially independently of the velocity of the axle relative to the vehicle body.

In the illustrated embodiment, a combined shock absorber/air spring unit is connected between the wheel and frame of a vehicle. It should be understood that the shock absorber or air spring unit can each be separated and either can be used alone with the other being of conventional design. The shock absorber includes a hydraulic sensor which provides signals to a computer which are representative of the position of the position within the shock absorber. The computer utilizes these signals to control compression and rebound hydraulic pressure regulators to produce preprogrammed compression and rebound damping forces that will yield the desired ride and handling. The air spring may be connected in series with the shock absorber for compression and rebound along the same axis. Pressure sensors and air pressure inlet and outlet valves are connected to the computer for adjusting the pressure within the air spring to provide the desired spring rate.

The computer can be programmed so that the vehicle will provide an extremely smooth ride on level highways. Simultaneously, the computer may also be programed so that only limited roll and pitch will be experienced during cornering and/or braking while bumps encountered during cornering and/or braking will be cushioned significantly. Computer programming may also simultaneously provide the vehicle with good off-road handling. Automatic load leveling may also be achieved. In summary, virtually any suspension characteristics can be achieved by appropriate programming. Thus, the suspension system for a given vehicle may provide an optimum set of ride and handling characteristics.

BRIEF DESCRIPTION OF THE DRAWING

FIG. 1 is a diagrammatic illustration of a preferred embodiment of the suspension system of the present invention.

FIG. 2 is a perspective view, with portions broken away, of a preferred embodiment of the combined shock absorber/air spring unit of the suspension system of FIG. 1.

DESCRIPTION OF THE PREFERRED EMBODIMENTS

Figure 3:
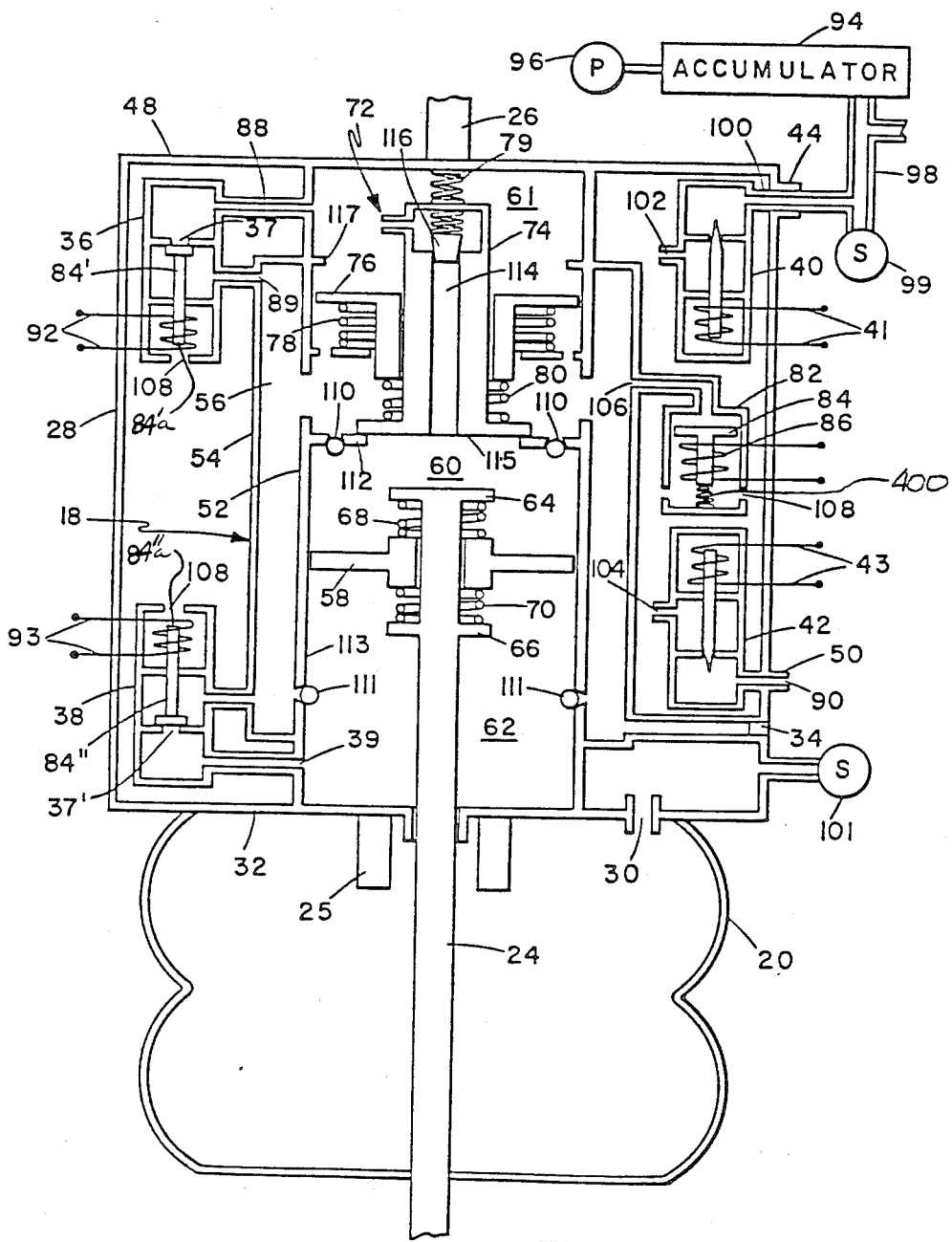
FIG. 3 is a schematic diagram of the combined shock absorber/air spring unit of FIG. 2.

Referring to FIG. 1, in acordance with the present invention, a wheel 10 is rotatably mounted on an axle 11 which extends from one end of a carrier 12. The other end of the carrier is pivotally mounted to the frame or body 14 of the vehicle. It should be understood that any wheel mounting approach may be used. A suspension unit 16 is connected between the frame 14 and the axle 11. The unit 16 combines an upper shock absorber 18 and a lower air spring 20. The wheel, axle and carrier thus comprise the unsprung portion of the vehicle and the frame and body comprise the sprung portion of the vehicle. The damping forces of the shock absorber 18 and the forces exerted by the air spring 20 are varied by a control circuit 22 in order to optimize the ride and handling characteristics of the vehicle under the wide range of driving conditions.

Referring to FIG. 2, the shock absorber 18 and the air spring 20 of the suspension unit are arranged in series for simultaneous compression and rebound along the same longitudinal axis as the wheel of the vehicle moves up and down with respect to the frame. The shock absorber piston rod 24 extends axially through the center of the air spring 20 and is connected to the axle of the wheel. The air spring is made of a flexible bellow. A connecting member 26 extends from the upper end of the shock absorber 18 and is attached to the vehicle frame.

An air tight cylindrical housing 28 concentrically surrounds the shock absorber 18. During compression and rebound of the air spring 20, air flows between the interiors of the air spring and the cylindrical housing 28 through a vent hole 30 in the base 32 of the housing. This air flow helps dissipate heat from the shock absorber 18. The size of the vent hole and air space in the housing 28 will affect the spring constant of the air spring 20. Hydraulic fluid may be filled or drained from the shock absorber 18 by removing a fill plug 34 which normally seals a passage that extends from the shock absorber through the base 32 of the housing.

Within the housing 28 (FIG. 2) are mounted a hydraulic compression pressure regulator 36 and a hydraulic rebound regulator 38. Also mounted within the housing 28 are an air pressure inlet valve 40 and an air pressure outlet valve 42. An air inlet nipple 44 and an electrical connection jack 46 are provided on an upper cap 48 of the housing. An air outlet nipple 50 is provided on the base 32 of the housing 28. A resilient bump stop 25 is provided to protect the suspension on severe bumps.

Further details of the preferred embodiment of the suspension unit 16 will now be described by way of reference to the schematic diagram of FIG. 3. The shock absorber 18 includes an inner cylinder 52 and an outer cylinder 54 which surrounds the inner cylinder and defines a reservoir 56. A main piston 58 is connected to the upper end of the piston rod 24 and reciprocates longitudinally within the inner cylinder 52. The piston 58 divides the inner cylinder 52 into an upper chamber 60 and a lower chamber 62. The inner cylinder 52 and the reservoir 56 of the shock absorber and all passages and chambers connected thereto are filled with a quantity of hydraulic fluid. There is no gas in contact with or in the fluid.

The piston 58 is slidable along the upper end of the piston rod 24 between a pair of fixed flanges 64 and 66. The piston 58 is centered between the flanges by springs 68 and 70. This resilient mounting of the main piston 58 relative to the piston rod 24 cushions any abrupt stops or starts of the piston, thereby eliminating the need for bleed valves in the main piston which are found in conventional shock absorbers. No fluid is intentionally allowed to pass between chambers 60 and 62 through piston 58.

While this is the presently preferred embodiment, because it allows the computer the maximum range of control over the compression and rebound damping forces through regulators, it is to be understood that the computer control of this invention may operate with shock absorbers having conventional valves in the main piston. Such an arrangement is discussed in connection with FIG. 5.

The shock absorber 18 is further provided with a compression amplifying valve 72 which is mounted above the upper chamber 60. The function of the valve 72 is described hereafter in greater detail. It includes a central flanged spool 74 and an outer flanged spool 76 which reciprocates about the inner flange spool. The reciprocation of the flanged spools is limited by springs 78, 79 and 80.

A hydraulic sensor 82 communicates with the reservoir 56 of the shock absorber. The hydraulic sensor 82 is not visible in FIG. 2. It includes a piston 84 (FIG. 3) which is moved by fluctuations in the amount of hydraulic fluid within the cylinder 52 due to the volume occupied by the piston rod 24. The hydraulic sensor 82 also includes a transducer such as a linear variable differential transformer 86. This transducer generates signals representative of the position of the piston 84 and therefore the position of the main piston 58.

The compression and rebound pressure regulators 36 and 38 may each comprise linear servo solenoid actuated valves. Signals may be applied to these solenoids to adjust the threshold blow off pressure required to open the passages 37 and 37' held closed by the solenoid pistons 84' and 84". This provides a pressure regulator whereby predetermined pressures within chambers 61 and 62 can be selected by valves 36 and 38, respectively. Fluid flow will be blocked until pressure reaches the preselected threshold pressure, at which time the valve opens and attempts to maintain that pressure.

Similarly, the air pressure inlet and outlet valves 40 and 42 may each comprise solenoid actuated valves. Signals may be applied to these solenoids to meter the flow of air therethrough. The various passages such as 88 and 90 which connect the valves of the aforementioned regulators to their fluid inputs and outputs are formed in the base 32 and cap 48 (FIG. 2) of the cylindrical housing 28. The leads such as 92 of the various solenoids are connected to the control circuit 22 via electrical connector 46. The control circuit applies signals to the solenoids of the regulators 36 and 38 to independently adjust the pressure of the hydraulic fluid in the upper chamber 61 and in the lower chamber 62 to provide predetermined compression and rebound damping forces. The pressure in chamber 61 sets the threshold pressure in chamber 60 by way of the pressure amplifying valve 72 to be described later.

The function of the air pressure inlet and outlet valves 40 and 42 is to adjust the air pressure within the air spring 20. The control circuit applies signals to the solenoids of these valves to meter the flow of air into and out of the housing 28. This also adjusts the air pressure within the air spring 20 since the air can flow from within the housing 28 and into the air spring through the vent hole 30. The air pressure inlet valve 40 is connected to a pressurized gas source, such as an accumulator 94 which is in turn connected to a pump 96. A pipe 98 connects the accumulator with the inlet nipple 44. This nipple communicates with the valve 40 through a passage 100 in the cap 48. Air pressure sensors 99 and 101 generate signals representative of the air pressure within the accumulator 94 and the air spring 20, respectively. The outlet orifice 102 of the valve 40 communicates with the interior of the housing. The inlet orifice 104 of the air pressure outlet valve 42 also communicates with the interior of the housing 28. The passage 90 formed in the base 32 of the housing connects the outlet of the regulator 42 to the outlet nipple 50. The passage 98 communicates the air pressure in accumulator 94 with all of the suspension units associated with the different wheels of the vehicle.

The general operation of the suspension unit 16 (FIGS. 2 and 3) can now be described. When the unit undergoes compression, the air spring 20 is compressed and energy is stored therein. The pressure of the hydraulic fluid in the chamber 60 increases as much as the pressure regulator 36 allows via amplifying valve 72. This determines the compression damping forces. During rebound, the air spring 20 expands releasing the stored energy. The pressure of the hydraulic fluid in the chamber 62 increases as much as the regulator 38 allows. This determines the rebound damping forces.

Hydraulic fluid completely fills the chambers 60 and 62 as well as the reservoir 56, the valves of the regulators 36 and 38 and the passages leading to and from these valves. Hydraulic fluid also fills the passage 106 leading to the hydraulic sensor 82. The cases of the sensor 82 and valves 36 and 38 have vent holes 108 to permit the pressurized air which is within the air spring 20 and the housing 28 to act on one side of the pistons 84, 84' and 84". The hydraulic fluid acts on the other side of the pistons. In this way, the shock absorber adds to the spring rate of the air spring due to its pressure on the fluid within the shock absorber.

During compression and rebound, the hydraulic sensor 82 provides signals to the control circuit indicating the position of the main piston 58 within the shock absorber. The control circuit uses this position information to adjust the regulators 36 and 38 as necessary to achieve predetermined compression and rebound damping forces. During compression, hydraulic fluid is pumped from the upper chamber 60 of the shock absorber, through the amplifying valve 72 via passage 114 or 115 or both, and the valve of the regulator 36 and into the reservoir 56. At the same time, hydraulic fluid from the reservoir is drawn through the check valves 111 and into the lower chamber 62 of the shock absorber. The amount of fluid which is pumped from the upper chamber 60 and the amount of fluid which is pumped into the lower chamber 62 during compression is not equal. This is because of the volume occupied by the portion of the piston rod 24 which is progressively inserted into the lower chamber 62 during compression. The extra hydraulic fluid moves the piston 84 of the sensor downwardly.

During rebound, hydraulic fluid is pumped from the lower chamber 62, through the pressure regulator 38 and into the reservoir 56. Hydraulic fluid is also drawn from the reservoir 56 through check valves 110 positioned in a seat member 112 of the compression amplifying valve 72 and into chamber 60. The piston 84 of the hydraulic sensor 82 now moves upwardly since the volume occupied by the piston rod diminishes. The signals generated by the transducer 86 thus represent the position of the main piston 58 within the shock absorber 18.

In addition, the action of the pressurized air on one side 84a, 84'a and 84"a of pistons 84, 84' and 84" provides a pressure bias to the hydraulic fluid which aids in preventing the formation of gas bubbles or cavitation in the hydraulic fluid during reciprocation of the piston. A spring 400 can also provided which acts on side 84a of piston 84 and adds to the pressure bias on the hydraulic fluid (FIG. 3). The lack of a spring on pistons 84', 84" of the solenoids can be overcome by providing for the fluid in communication with the reservoir 56 to completely surround the pistons 84' and 84" including the portions within the electrical coils (84'a, 84"a). Otherwise, an appropriate bias spring can be added to the pistons 84' and 84" to balance the fluid pressure resulting from spring 400. It is to be understood that, although the presently preferred embodiment employs both the action of pressurized air and the action of spring 400 on side 84a of piston 84 to produce a pressure bias on the hydraulic fluid, either could be used alone or some alternate way of applying pressure to that side of piston 84 could be adopted. Avoiding bubble formation in the hydraulic fluid is important to maintain good damping characteristics in that fluid.

The compression pressure regulator 36 cannot adequately control exceedingly low compression forces which may be required in the upper chamber 60, because the orifice 37 is too small for the amount of fluid that must flow from chamber 60 into reservoir 56 during rapid movement of piston 58. Therefore, the compression amplifying valve 72 enables low compression damping forces to be generated, by providing sufficient orifice size for large flow rates at low compression damping forces, as may be desired. In addition, exceedingly high compression forces can be provided by the compression amplifying valve at all flow rates.

The compression amplifying valve 72 operates as follows. As the piston 58 starts to move upward, the pressure of the hydraulic fluid within the chamber 60 increases. Spring 79 keeps spool 74 against orifice 115 for a minimum pressure in chamber 60. Hydraulic fluid is forced through an orifice 114 and check valve 116 in the flanged spool 74 into the upper chamber portion 61. The pressure within the chamber 61 is adjusted by the compression pressure regulator 36. If the pressure in chamber 61 is minimal, the flanged spool 74 rests against the seat 117, and flanged spool 74 rests against the seat 112. As the velocity of the main piston 58 increases, pressure builds up against the flange of the spool 74. The spring 79 determines the blow-off force required to displace the flanged spool 74 upwardly. As the flanged spool 74 blows off, the spring 80 is compressed.

As the regulator 36 increases the pressure in the upper chamber 61, the flanged spool 76 is pushed downwardly against the springs 78 and 80. The force which pushes the flanged spool 76 downwardly is significantly greater than the force which pushes the flanged spool 74 upwardly, if chambers 60 and 61 are at similar pressure. This is because the area of the flange of the spool 76 is significantly greater than that of the spool 74. As the flanged spool 76 is pushed downwardly, the compression of the springs 78 and 80 increases the force required for blow-off of the flanged spool 74 in such a manner as to set the threshold blow-off pressure in chamber 60 via spool 74 to that of chamber 61 plus the preset bias pressure set by spring 79. This establishes a blow-off pressure for spool 74 to that set by pressure regulator 36 plus a small bias set by spring 79. This bias pressure insures that fluid flows through passage 114, opening check valve 116. Check valve 116 insures that the desired pressure in chamber 61 as set by pressure regulator 36 remains during rebound (low pressure in chamber 60).

When the pressure in the chamber 61 pushes the flanged spool 76 down to where spring 80 is completely compressed, the spring 80 no longer functions. Any increased pressure in the chamber 61 must be matched by several times that pressure in the chamber 60 in order to blow-off the flanged spool 74. This facilitates much higher pressure in the chamber 60 than the regulator 36 could produce. Proper selection of the strength of the springs 78, 79 and 80 with respect to one another is required in order to achieve the compression amplifying function.

The rebound pressure regulator doesn't require the amplifying valve because the rebound speeds are more consistent since they deal primarily with the natural frequency of the unsprung mass. This can be adequately controlled by selection of the fixed size of passage 39 in combination with the variable threshold pressure set by pressure regulator 38.

Figure 4:
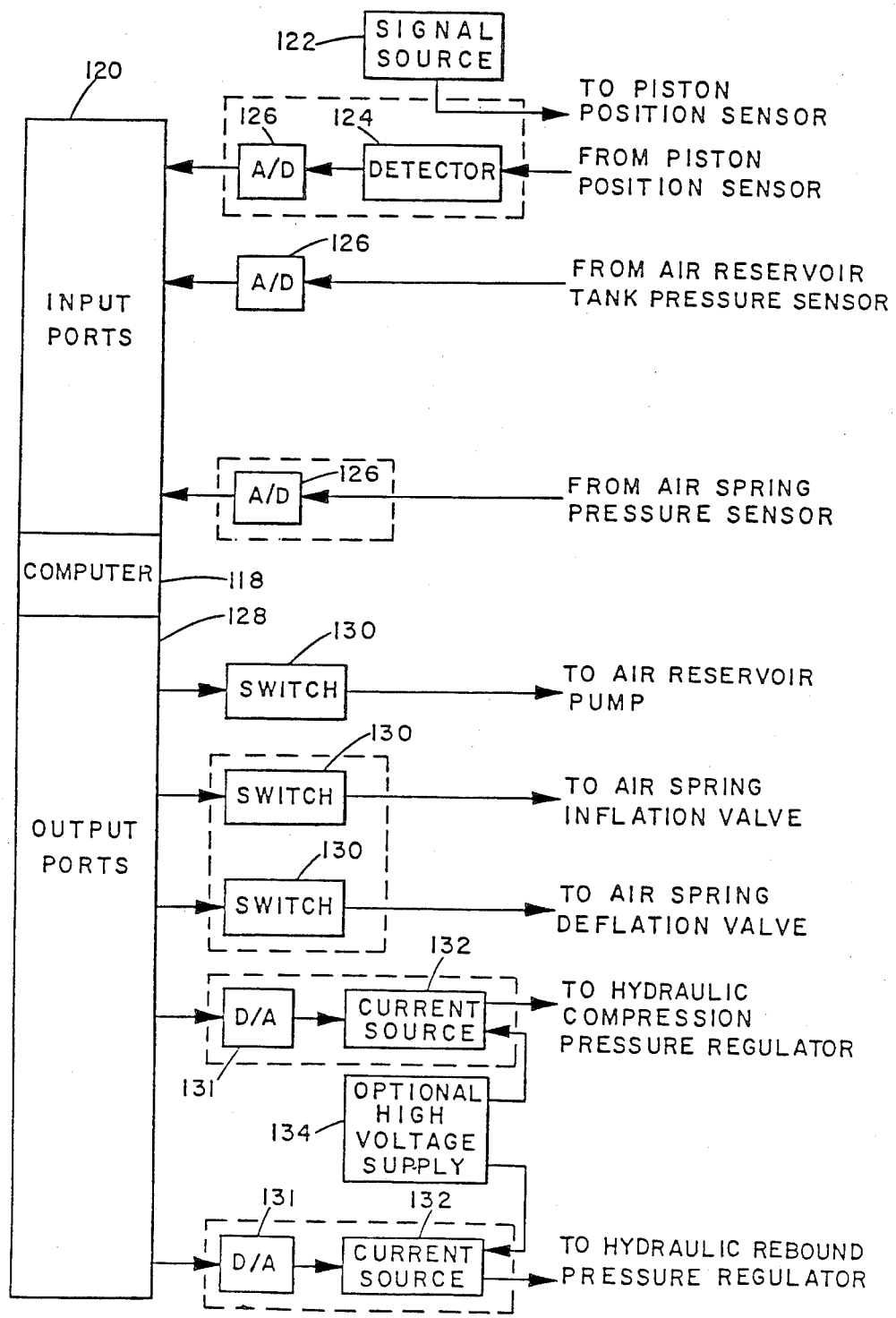
FIG. 4 is a block diagram of one form of the control circuit of the suspension system of FIG. 1.

A preferred embodiment of the control circuit 22 will now be described by way of reference to FIG. 4. The components illustrated within the dotted outlines may be repeated as necessary dependent upon the desired system control. This control circuit simultaneously controls all of the suspension units associated with the different wheels of the vehicle. The circuit includes a computer 118 such as a microprocessor having suitable RAM and ROM memories connected thereto for storing computation information and an operational program, respectively. The computer 118 has input ports 120 connected thereto for receiving signals from various transducers within the suspension units. These include the piston position sensors or transducers 82 on each suspension unit, the air pressure sensor 99 and the air pressure sensor 101 on some or all of the suspension units.

Where the hydraulic sensor 82 comprises a transducer, a signal source 122 may be connected to the input of the transducer and the output of the transducer is connected to a detector 124. Analog to digital converters 126 convert the analog signals from the transducers in the suspension unit into digital form before they are input to the computer 118 through the input ports. Using the operational program stored in the ROM of the computer 118, the microprocessor continuously determines the optimum compression and rebound damping forces as well as the optimum spring rate. Commands are sent from the computer 118 to control the pump 96, air pressure inlet and outlet regulators 40 and 42 on some or all of the suspension units, and the compression and rebound regulators 36 and 38 on each suspension unit.

Output ports 128 provide the interface between the computer 118 and the devices which it controls. Digitally controlled switches 130 are utilized to turn the air pump 96 on the off and to open and close the air pressure valves. Digital-to-analog converters 131, current sources 132 and an optional high voltage supply 134 are utilized to generate the signals necessary to control the hydraulic compression and rebound pressure regulators 36 and 38.

Figure 6:
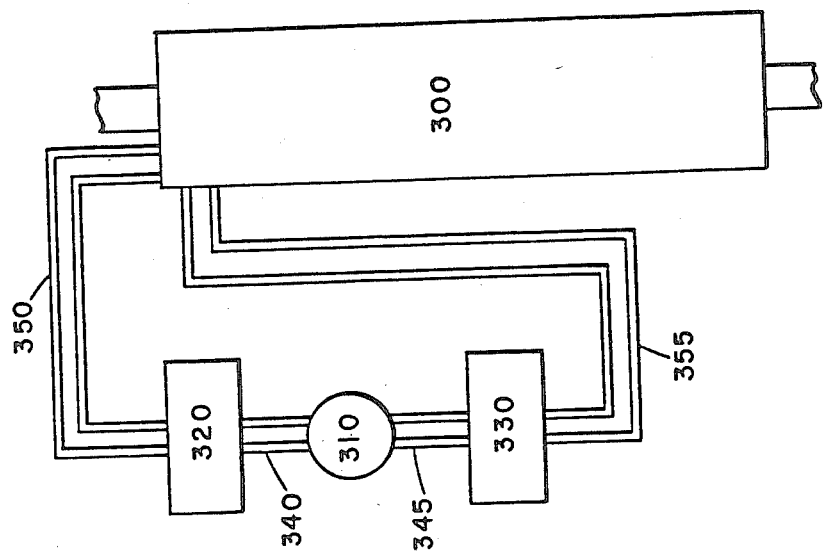
FIGS. 5 and 6 are schematic diagrams illustrating other variations of the system.
Figure 5:
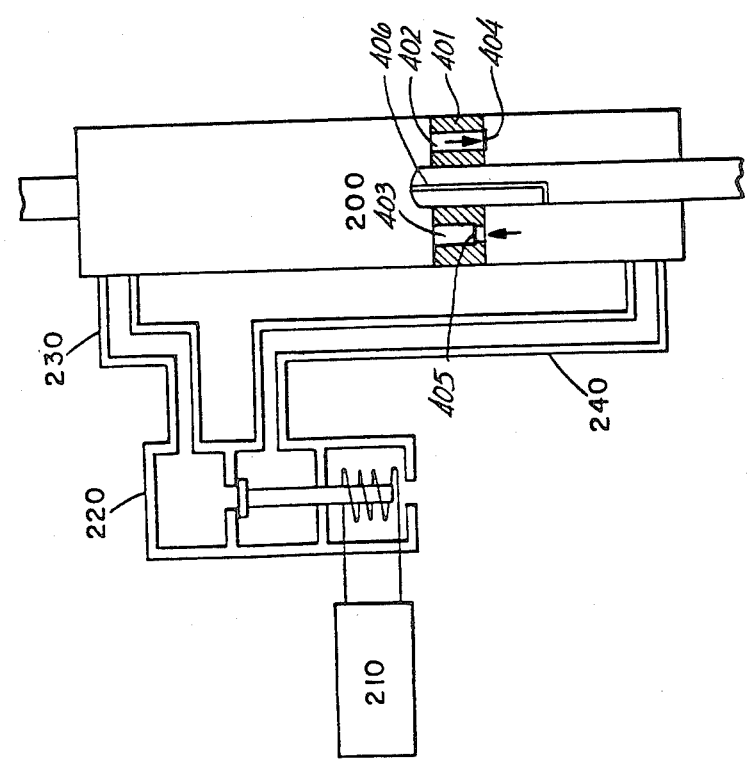

Variations of the system are illustrated in FIGS. 5 and 6. FIG. 5 illustrates the simplest possible electrically controllable shock absorber. The shock absorber 200 is that of any conventional design. The variation is that the first stage valving or "bleed orificing" includes orifice 406 in the piston which is set for very rapid pressure build up or may be removed for improved roll control and performance.

An example of this type of valving is provided in FIG. 5. The sectional view of piston 401 shows a pair of origices 402 and 403 extending through piston 401 to provide passageways for hydraulic fluid to flow between compression and rebound chambers during reciprocation by the piston. A spring loaded valve 404, at the lower opening of orifice 402, operates to allow hydraulic fluid to flow through the orifice when a certain pressure is reached during compression of the shock absorber but remains closed during rebound. Conversely, a spring loaded valve 405, at the lower opening of orifice 403, operates to allow fluid to flow through the orifice when a certain pressure is reached during rebound of the shock absorber but remains closed during compression. The diameter of these orifices may be selected to provide the appropriate valve characteristics. It is to be understood that other conventional high performance valving could also be used or modified in this variation of the invention. For example, the bleed orifice 406 may be eliminated.

Although the valves in the piston and orifice 406 have been described with reference to FIG. 5, these same elements may be employed with the piston 58 and rod 24 in the embodiment of FIG. 3 which includes springs 68 and 70.

A solenoid pressure regulator valve 220 of the preferred embodiment is connected between the compression chamber via conduit 230 and the rebound chamber via conduit 240. A control circuit 210, either manual or automatic, can set the initial first stage blow-off pressure on compression to any level from very low pressure for soft control to very high pressure for stiff control. This is accomplished by allowing the valve 220 to bypass the fluid flow around the first stage orificing within the chock absorber 200 upon compression.

FIG. 6 illustrates a variation that is capable of much higher performance. In FIG. 3, the fluid pressure in chamber 61 is obtained by fluid flow through passage 114 due to the bias pressure generated by the action of spring 79 on spool 74. This flow is limited for soft ride characteristics. If chamber 61 is isolated from the fluid in the shock absorber and connected to an external fluid pressure supply as shown in FIG. 6, then faster response can be obtained. Referring to FIG. 6, the shock absorber 300 is that shown in FIG. 3 only spring 79 is removed and passage 114 is blocked. Passage 88 in FIG. 3 is connected to passage 350 in FIG. 6. Passage 89 in FIG. 3 is connected to passage 355 in FIG. 6. The operation of the system illustrated in FIG. 6 is as follows. The blow-off pressure of spool 74 in FIG. 3 is still set by the pressure in chamber 61 of FIG. 3. However, the fluid pressure in chamber 61 of FIG. 3 is set by valve 36 with the fluid flow into chamber 61 provided through passage 350 from a high pressure fluid accumulation 320 in FIG. 6. The return fluid flow from valve 36 in FIG. 3 goes to a fluid reservoir 330. A pump 310 is then connected between accumulator 320 and reservoir 330 via passages 340 and 345 to recharge the accumulator 320.

It should be obvious that there are many variations of the preferred embodiment that can utilize the pressure regulator solenoid valve and amplifying valve, in different combinations. In particular, the amplifying valve can have spring 80 removed and spools 74 and 76 attached as one unit. The main blow-off orifice 115 would normally be open. When pressure in chamber 61 is increased due to valve 36, the larger area at spool 76 attached directly to spool 74 and the blow-off flange causes the pressure in chamber 60 to reach a multiple of that in chamber 61 at all times for much higher performance.

Another variation of valve 72 occurs when amplification is not required. In this case spring 78 is removed and spool 76 is rigidly attached to the valve body such as at seat 117. The surface area of spool 74 facing chamber 61 can be made equal to the surface area of spool 74 facing chamber 60. In such case pressure settings in chamber 61 are equal to that in chamber 60 for blowoff conditions at orifice 115.

There are a number of key points and factors which are important to keep in mind with respect to this invention and which have been referred to above. A listing of these factors follows:

1. The description is for a four-wheel vehicle, but the principles are applicable to any number, even a multiwheeled vehicle for off road or military use.
2. Position of the main piston in the shock absorber represents the position of the axle with respect to the chassis.
3. Position output signals are not necessarily required from every suspension unit of a vehicle, but it is highly desirable that there be position signals from each wheel of a four-wheel vehicle.
4. Spring rate output signals may be from any number of the suspension units, from zero to all the springs.
5. The system provides the enumerated advantages at relatively low cost and weight, improves aerodynamics with the height control function, adapts for wear automatically, utilizes conventional manufacturing, is highly reliable, employs low (10%) tolerance components and provides a luxury ride simultaneously with high stability performance.

In summary, this control system provides a cost effective suspension which may be controlled by microprocessor technology to achieve fundamental suspension control of any vehicle while approaching the theoretical limit of suspension performance and providing near ideal ride characteristics.

Having described a preferred embodiment of our invention, it should be apparent to those skilled in the art that our invention may be modified in arrangement and detail. Therefore, the protection afforded our invention should be limited only in accordance with the scope of the following claims.

What is claimed is:

1. A damping device having a cylinder for receiving hydraulic fluid, a piston rod, and a piston mounted on the piston rod which is reciprocable within the cylinder and defines therein a compression chamber and a rebound chamber on opposite sides of the piston, the improvement comprising:

hydraulic sensor means in communication with the hydraulic fluid in the cylinder for generating signals representative of the position of the piston within the cylinder in response to the volume of hydraulic fluid displaced from the cylinder by the piston rod.

2. A damping device according to claim 1 wherein the hydraulic sensor means further comprises:
   a further cylinder; and
   a further piston reciprocable within the further cylinder and having one surface acted upon by the hydraulic fluid in communication with the damping device cylinder.

3. A damping device according to claim 2 wherein the sensor means is adapted to receive a fluid at a second surface of the further piston which pressure biases the hydraulic fluid and aids in preventing cavitation in the hydraulic fluid.

4. A damping device according to claim 2 further comprising spring means for applying pressure to a second surface of the further piston to thereby bias the further piston and aid in preventing cavitation in the hydraulic fluid.

5. A damping device according to claim 1 wherein the piston comprises valve means for selectively allowing fluid to pass between the compression and rebound chambers.

6. A damping device having a cylinder for receiving hydraulic fluid, a piston rod, and a piston mounted on the piston rod which is reciprocable within the cylinder and defines therein a compression chamber and a rebound chamber on opposite sides of the piston, the improvement comprising:
   first electrically controllable pressure regulator means coupled to the compression chamber, and second electrically controllable pressure regulator means coupled to the rebound chamber, the first and second pressure regulator means being adapted to receive signals from a control circuit for independently adjusting the pressure of the hydraulic fluid in the respective chambers during reciprocation of the piston.

7. A damping device according to claim 6 wherein the damping device further comprises:
   a reservoir for fluid,
   the first pressure regulator means being coupled for passing fluid between the compression chamber and the reservoir; and
   the second pressure regulator means being coupled for passing fluid between the rebound chamber and the reservoir.

8. A damping device according to claim 7 wherein each damping device further comprises:
   first check valve means for allowing fluid to pass between the reservoir and the compression chamber; and
   second check valve means for allowing fluid to pass between the reservoir and the rebound chamber.

9. A damping device according to claim 8 wherein the damping device further comprises a hydraulic sensor means in communication with the hydraulic fluid in the reservoir for generating signals representative of the position of the piston within the cylinder in response to the volume of hydraulic fluid displaced from the cylinder by the piston rod.

10. A damping device according to claim 9 wherein the hydraulic sensor means further comprises:
    a further cylinder; and
    a further piston reciprocable within the further cylinder and having one surface acted upon by the hydraulic fluid in communication with the damping device reservoir.

11. A damping device according to claim 10 wherein the sensor means is adapted to receive a fluid at a second surface of the further piston which pressure biases the hydraulic fluid and aids in preventing cavitation in the hydraulic fluid.

12. A damping device according to claim 10 further comprising spring means for applying pressure to a second surface of the further piston to thereby bias the further piston and aid in preventing cavitation in the hydraulic fluid.

13. A damping device according to claim 8 wherein the piston comprises valve means for selectively allowing fluid to pass between the compression and rebound chambers.

14. A damping device comprising:
    a cylinder for receiving hydraulic fluid;
    a piston rod;
    a piston mounted on the piston rod adapted for reciprocable movement within the cylinder and defining therein a compression chamber and a rebound chamber on opposite sides of the piston;
    sensor means for generating signals representative of the position of the piston within the cylinder; and
    at least one electrically controllable pressure regulator means coupled to at least one of the cylinder chambers and adapted to receive signals from a control circuit for adjusting the pressure of the hydraulic fluid in the chamber, independent of the pressure in the other chamber, during reciprocation of the piston.

15. A damping device as described in claim 14 wherein the sensor means comprises hydraulic sensor means in communication with the cylinder and responding to the volume of hydraulic fluid displaced from the cylinder by the piston rod.

16. A damping device according to claim 14 wherein the at least one pressure regulator means comprises first pressure regulator means coupled to the compression chamber and second pressure regulator means coupled to the rebound chamber for independently adjusting the pressure of the hydraulic fluid in their respective chambers during reciprocation of the piston.

17. A damping device as described in claim 16 wherein the sensor means comprises hydraulic sensor means in communication with the cylinder and responding to the volume of hydraulic fluid displaced from the cylinder by the piston rod.

18. A damping device according to claim 14 wherein the piston comprises valve means for selectively allowing fluid to pass between the compression and rebound chambers.

19. A damping device comprising:
    controllable shock absorber means extendable in compression and rebound directions;
    sensor means in communication with the shock absorber means for generating signals representative of the degree of extension of the shock absorber means; and
    regulator means coupled to the shock absorber means for independently adjusting the damping force of the shock absorber means in response to the changes in extension in the compression direction and in the rebound direction.

20. Suspension apparatus comprising:
    spring means;
    regulator means coupled to the spring means for adjusting the spring rate of the spring means;
    shock absorber means;

sensor means in communication with the shock absorber means for generating signals representative of the degree of extension of the shock absorber means; and regulator means coupled to the shock absorber means for independently adjusting the compression damping force of the shock absorber means and the rebound damping force of the shock absorber means.

21. Suspension apparatus according to claim 20 comprising sensor means in communication with the spring means for generating signals representative of the spring rate of the spring means.

22. A damping device according to either of claims 6 or 14 wherein the piston is mounted on the piston rod by resilient mounting means such that, upon a change in direction of the movement of the piston within the cylinder, the pressure within the chamber being acted upon by the piston gradually increases to the pressure set by the pressure regulator means coupled to that chamber.

23. A damping device according to claim 6 wherein each pressure regulator means further comprises an electrically-actuated valve that opens in response to a threshold pressure determined by signals applied to the valve.

24. A damping device for controlling resistance forces to compression and rebound movement between opposite sides of the device comprising:

electrically controllable pressure regulator means adapted to receive signals from a control circuit for independently controlling compression movement and rebound movement resistance forces between the opposite sides of the device during compression and rebound movement between the opposite sides, and means responsive to a change in movement between the first and second sides for cushioning such resistance forces.

25. A damping device according to claim 24 wherein the damper comprises a piston movable in a chamber and the regulator means comprises separate electrically controlled valve means for controlling the flow of fluid to and from each side of the pistons.

26. A damping device according to claim 25 wherein the change responsive means comprises a resilient mounting for said pistons.

27. A method for damping periodic forces exerted on a system comprising the steps of:

absorbing the compression and rebound forces exerted on the system with hydraulic fluid; and electrically and independently controlling the regulation of the pressure of the hydraulic fluid absorbing the compression forces and the pressure of the hydraulic fluid absorbing the rebound forces.

28. A method for controlling resistance forces to compression and rebound movement between opposite sides of a damping device comprising the steps of:

controlling electrically and independently compression movement and rebound movement resistance forces between the opposite sides of the device during compression and rebound movement between the opposite sides, and cushioning such resistance forces upon a change in movement between the first and second sides.

29. A method according to claim 28 wherein the damping device comprises a piston movable in a chamber and the step of controlling independently compression movement and rebound movement resistance forces comprises the step of controlling the flow of fluid to and from each side of the piston with separate electrically controlled valve means.

30. A method according to claim 29 wherein the step of cushioning such resistance forces comprises the step of mounting said piston resiliently.

31. A method according to claim 27 wherein controlling the regulation of the pressure of the hydraulic fluid is accomplished using valve means adapted to receive signals from a control circuit.

32. A method according to claim 28 wherein controlling electrically and independently compression movement and rebound movement resistance forces is accomplished using valve means adapted to receive signals from a control circuit.

* * * * *